US005426588A

United States Patent [19]

Walters et al.

[11] Patent Number: 5,426,588

[45] Date of Patent: Jun. 20, 1995

[54] METHOD FOR ENGRAVING A GRAVURE CYLINDER

[75] Inventors: David W. Walters, Walworth; Rukmini B. Lobo, Webster, both of N.Y.

[73] Assignee: Eastman Kodak Company, Rochester, N.Y.

[21] Appl. No.: 201,734

[22] Filed: Feb. 25, 1994

[51] Int. Cl.⁶ .......................... G06F 15/00; B41C 1/00

[52] U.S. Cl. .................................. 364/468; 101/401.1

[58] Field of Search ............................... 364/468, 476; 101/401.1

[56] References Cited

U.S. PATENT DOCUMENTS

| | | | |
|---|---|---|---|
| 4,301,583 | 11/1981 | Poole | 29/121.2 |
| 4,319,827 | 3/1982 | Carter et al. | 354/304 |
| 4,608,643 | 8/1986 | Breitenstein et al. | 364/474 |
| 4,623,972 | 11/1986 | Darby et al. | 364/526 |
| 4,841,611 | 6/1989 | Kusaba et al. | 29/121.2 |
| 4,912,824 | 4/1990 | Baran | 29/121.2 |
| 4,939,994 | 7/1990 | Puleston | 101/348 |
| 4,992,948 | 2/1991 | Pilland et al. | 364/474.15 |
| 5,093,180 | 3/1992 | Morgan | 428/156 |
| 5,293,426 | 3/1994 | Wouch et al. | 382/1 |

*Primary Examiner*—Paul P. Gordon
*Attorney, Agent, or Firm*—Carl F. Ruoff

[57] ABSTRACT

The present invention describes a method for engraving a gravure cylinder. The method includes determining the coverage of the liquid composition desired, and then selecting parameters including the stylus angle and compression angle. The channel width to cell width ratio and the wall width to cell width ratio are specified. From this the cell width, channel width and wall width are calculated. The gravure cylinder is engraved according to the stylus angle, compression angle, wall width, channel width and cell width.

8 Claims, 2 Drawing Sheets

METHOD FOR ENGRAVING A GRAVURE CYLINDER

FIELD OF THE INVENTION

The present invention is a method for controlling electromechanical cylinder engraving to tailor a cylinder for a specific coating need. More particularly, the present invention provides a method of engraving gravure cylinders which improves coating quality and predictability.

BACKGROUND OF THE INVENTION

Gravure cylinders are used for coating liquid compositions on moving supports. The amount of liquid deposited by the gravure cylinder is a function of the recessed cells on the surface of the cylinder. A traditional strategy towards the design of an engraving for the gravure cylinder has been reliance on a large inventory of finished cylinders having different engraved cell patterns, sizes and shapes. The proper lay down of the liquid coating composition is determined empirically, by either trying a number of cylinders, or using cylinders that worked previously. In trying to achieve a desired lay down of a new coating composition, an engineer would typically specify a cylinder type to an engraver and say "make it like this cylinder except . . . ". Although somewhat successful, the shortcomings of this method are the reliance upon empirical experimentation and the ability of a single source engraver service to make it "like another cylinder". The engraver would empirically change the cell depth to increase or decrease fluid deposit lay down with a minimum concern for cell geometry effect on coating quality.

The present invention is a method that solves the above described shortcomings. The invention allows one to specify to an engraver the proper parameters needed to engrave a cylinder that will produce the desired coating coverage.

SUMMARY OF THE INVENTION

The present invention is a method for engraving a gravure cylinder having a circumference C for coating a liquid composition on a substrate. The method includes determining the coverage VA, of the liquid composition on the substrate. A stylus angle $\theta$ and compression angle $\alpha$ are selected. The ratio $(W_c/W_o)$ of channel width to cell width is specified. The ratio $(W_w/W_o)$ of wall width to cell width is specified. The cell width is calculated according to:

$$X = W_o + W_c + 2W_x$$

Wherein X is the horizontal repeat length and $$VA = \frac{1122.5}{\tan\theta/2}\,[3W_o^2 + 2W_oW_c + 3W_c^2](\sqrt{2}\,/X)$$

The channel width $W_c$ and wall width Ww are then calculated. The gravure cylinder is then engraved according to $\theta$, $\alpha$, $W_c$, $W_w$ and $W_o$. For an Ohio engraving machine the horizontal screen HS is determined from $$HS = \sqrt{2}\,/X$$

The actual screen is calculated according to $$AS = \frac{HS\sqrt{2}}{\sqrt{\tan\alpha}}.$$

The vertical screen is calculated according to $$VS = \frac{AS}{\sqrt{\tan\alpha}\ \sqrt{2}}.$$

The engraver vertical setting $N_2$ is determined from $$N_2 = \frac{C^*VS}{7.5}$$

The cylinder is then engraved according to $N_2$ and $\theta$ (Ohio engraving machine).

The present invention allows one to engrave a gravure cylinder according to measurable parameters rather than relying on empirical methods.

Figure 1:
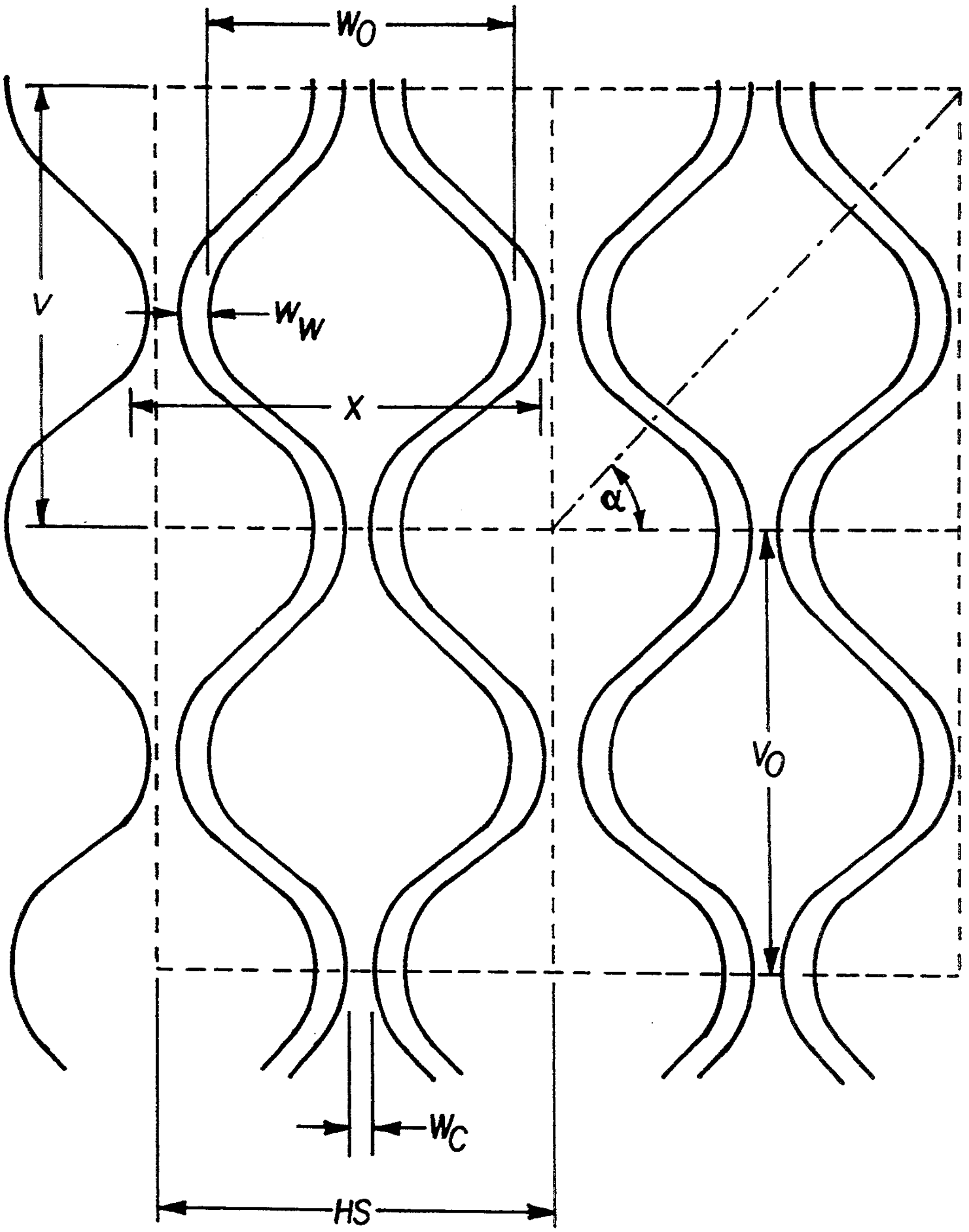
FIG. 1 shows the engraving pattern of produced by an electrochemical engraving machine.

For a better understanding of the present invention together with other objects, advantages and capabilities thereof, reference is made to the following disclosure and claims in connection with the above described drawings.

BRIEF DESCRIPTION OF THE PREFERRED EMBODIMENTS

The electromechanical engraving machine in its simplest form has three basic parts; a scanning head, a control panel/processing unit and power supply, and an engraving head and cylinder station. To make an engraving, a photographic print is mounted upon the scanning drum, simple patterns can be directly computer programmed, and a blank copper plated and polished cylinder is placed onto the engraving station. The cylinder to be engraved revolves at a synchronized speed with the scanner drum. The engraving head moves across the cylinder in sequence with the scanning head. It reads the information on the photographic print and transmits the information to a central processor unit that modifies and forwards the signals to the engraving head. The engraving head responds by thrusting a pyramid shaped diamond stylus into the soft copper to engrave a discreet cell. The size of the cell is controlled by the electronics and the dimensions of the diamond stylus. The narrower the point of the diamond, the smaller the stylus angle. Cell depth variations are controlled by modulating the strength of the signal sent to the engraving head. The stylus itself vibrates at a constant speed and amplitude. By varying the electric current the signal moves the stylus assembly in and out of the copper surface, engraving a recessed cell to a depth proportional to the signal voltage. A channel is formed by incomplete withdrawal of the diamond cutting stylus, forming linkage between the individual cells. Recent software and internal electronic circuitry improvements make it possible to control cell engraving digitally. It is important that the digitized signal contain all the information to be engraved because cell characteristics are programmable on the machine and are independent of the blank base cylinder material, typically copper. After engraving, the cylinder is deburred and buffed. The cylinder is then chrome-plated, cross-hatched and polished. It is to be kept in mind that the chrome-plating has a unique set of processing variables that can and probably does affect the final cell volume.

Because of the importance and complexity of the engraving process, an effort to establish empirical relationships that describe the dependence of cell geometry characteristics on engraving process specifications and control parameters has been completed. The cell volume model is derived in terms of simple geometry mathematics and expressed in terms that control the digitized input to an electromechanical engraving machine. The model does not account for cylinder processing steps after engraving. The relative calculated volume is, however, in excellent agreement with observed color hard copy donor dye fluid and print lay down fluid deposit density. The cell shaped characteristics dramatically effect the coating quality uniformity.

Electromechanical engraving machines produce high quality gravure cylinders. An engraved normal cell from an electromechanical engraving machine is shown in FIG. 1. The single cell is characterized by dimensions of cell width ($W_o$) as measured at the inside wall of the cell and ($V_o$) the cell height. The single cell is well bounded by continuous walls having a width $W_w$, except for a connecting channel ($W_c$). The individual cells are most often connected by an axial channel. The single cell is normally nested into an ordered array to form a very large cell population density. Tradition has maintained definition of the cell count within the array by drawing an imaginary screen around the individual cell as shown by the dotted lines.

Figure 2:
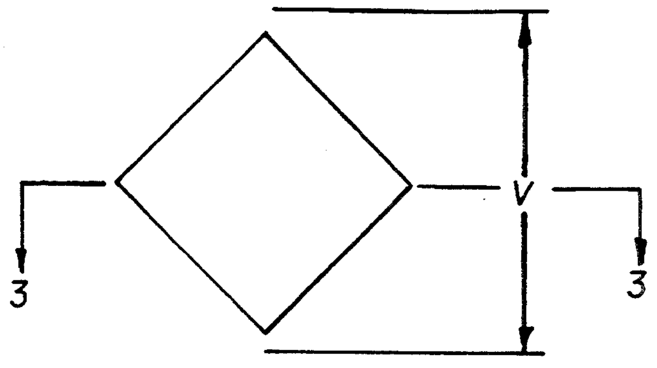
FIG. 2 shows a simplified version of an electromechanically engraved cell.

Initially, a volume per unit area of an electromechanical engraving was derived. The derivation is shown below. To simplify the calculation, a diamond is used to approximate the wall bound of an electromechanically engraved cell. Plain geometry dimensions on the resulting simplified cell are shown in FIG. 2. The height is a function of the engraved cell vertical line screen (VS) dimension as, 1/(V) (in lines/$\mu$m).

Figure 3:
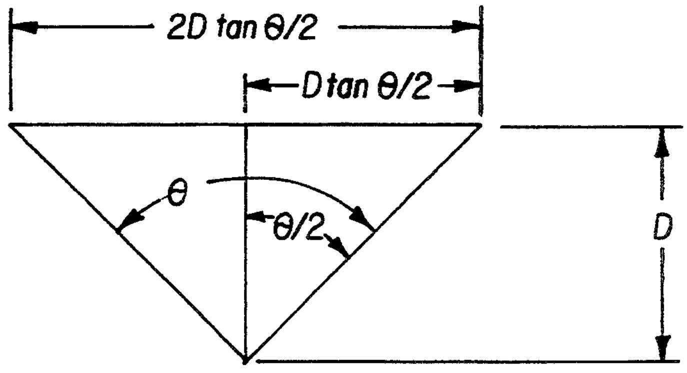
FIG. 3 is a view along line 3—3 of FIG. 2.
Figure 4:
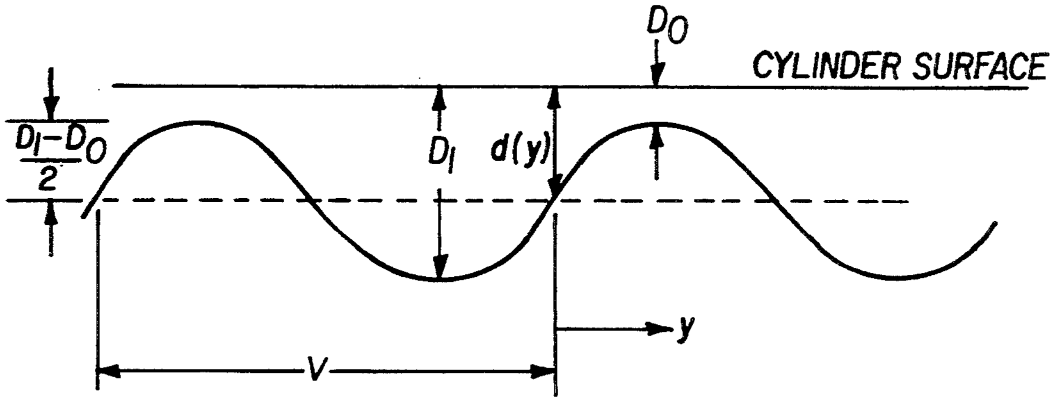
FIG. 4 is a side view of an electromechanically engraved cell.

A bisection of the simplified cell in its axial direction along the line 3—3 is shown in FIG. 3. FIG. 3 shows the engraving diamond stylus cut into the copper to depth D, and having an included stylus angle, Cutting the cell circumferentially along the vertical line screen midpoint of the engraving direction and looking at the cell from the side, FIG. 4 shows the in and out travel stroke of the engraving stylus as it engraves in the y direction. The depth maximum of stylus entry into the cylinder surface, is D. The channel is formed by the incomplete withdrawal of the stylus. One period of engraving corresponding to the cell from midpoint channel to midpoint channel, i.e., height, is 1/(VS).

The cell width at any axial point along the engraving is $W(y)=2D \tan \theta/2$, the maximum cell width is therefore $2d \tan \theta/2$.

where $$d = D_0 + \frac{(D_1 + D_0)}{2} - \frac{D_1 - D_0}{2} \sin\left(\frac{2\pi}{Vy}\right)$$

The connecting channel would have the same shape as the cell at its depth, $D_o$, but less deeply cut than the cell. The minimum channel width is $2D_o \tan \theta/2$ . The area of the triangle looking into the front view of the cell is $$\text{area} = 1/2(d)(2d \tan \theta/2) = d^2 \tan \theta/2$$

The volume of an individual normal cell having compression angle $\alpha$ equal to 45° is found by integrating in the machine engraving direction (y), along the vertical line screen.

$$\text{volume/cell} = \int_o^v(\text{area})dy = \int_o^v(d^2 \tan\theta/2)dy$$

This relationship, using algebra converts to:

$$\text{volume/cell} = \frac{V}{32 \tan\theta/2}[3W_0^2 + 2W_0W_c + 3W_c^2] \quad (1)$$

The horizontal repeat length X, is the width across one electromechanical cell which comprises the cell width, two wall widths and a channel width.

$$X = W_o + W_c + 2W_w \quad (2)$$

The horizontal and vertical screens (HS and VS are defined as:

$$HS = \frac{1}{X,} \quad (3)$$

$$VS = \frac{1}{V}$$

According to the Ohio engraver's definition, however, the horizontal and vertical screens defined in equation 3 are both multiplied by $\sqrt{2}$. The actual screen (AS), is the square root of the reciprocal of the area per unit cell (screen population).

$$AS = \sqrt{\frac{2}{XV}} \quad (4)$$

The horizontal and vertical repeats are related by the compression angle $\alpha$. Alternatively, the horizontal and vertical screens can also be calculated from the actual screen and compression angle using the following equations:

$$\tan\alpha = \frac{HS}{VS} = \frac{V}{X} \quad (5)$$

$$HS = \frac{AS^* \sqrt{\tan\alpha}}{\sqrt{2}} \quad (6)$$

$$VS = \frac{AS}{\sqrt{\tan\alpha} * \sqrt{2}}. \quad (7)$$

Since,

-continued $$\text{vol/area} = \text{vol/cell} \times \left(\frac{\text{cell}}{\text{area}}\right)_{or\ AS2}, \tag{8}$$

Substituting equation 1 into equation 8 and converting to square inches yields $$\text{volume/sq.inch} = \frac{1122.5}{\tan\frac{\theta}{2}}\,[3W_0^2 + 2W_0W_c + 3W_c^2]HS \tag{9}$$

At this point, depending on the engraving machine, a gravure cylinder can be manufactured according to the stylus angle $\theta$, the compression angle $\alpha$, the cell width $W_o$, the channel width $W_c$ and the wall width $W_w$. Any engraving machine settings can be determined from these 5 parameters.

For example, engraver vertical setting is a variable that is specified for an Ohio engraving machine. For an Ohio engraving machine the engraver vertical setting ($N_2$) can be calculated by:

$$N_2 = \frac{\text{Circumference*Desired vertical screen}}{7.5} \tag{10}$$

(7.5 is the Ohio engraving machine constant). The engraver's usually define the vertical and horizontal screen by multiplying the actual vertical and horizontal screens by $\sqrt{2}$. Hence, they would calculate $N_2$ by dividing the right hand side of equation 10 by $\sqrt{2}$.

The procedure for specifying an engraving of a gravure cylinder is as follows:

To determine the required coverage, in cc per square feet, based on density specifications of the product. Standard density versus lay down calibrations are usually available for each product. A typical engraving is expected to deliver approximately 50 to 58 percent of the engraved volume.

Choose a stylus angle $\theta$ for the engraving between 110 and 140 degrees. Note that for a given volume per unit area a smaller stylus usually implies finer screen count which will take longer to engrave and, therefore, be more expensive.

Choose a compression angle $\alpha$. Experimental studies have shown that smaller compression angles coat more uniformly, particularly with solvent solutions. Engravings done with a compression angle less than 38 degrees, however, are difficult to engrave and are not usually very uniform.

The channel width to cell width ratio ($W_c/W_o$) is defined. For a 40 degree compression angle this ratio should be greater than 16 percent and less than 20 percent. For a 36 degree compression angle the window for this ratio is expected to be between 10 and 15 percent. It is expected that this ratio be between 15 and 30 percent for most applications. The confines of this ratio are defined by the regimes of two distinct types of coating defects. Engravings with a ratio below the lower limit have a tendency to coat with defects like grain with dark spots and further, form diagonal strings of grain. Engravings with a ratio greater than the upper limits specified above coat with ribbing and strings of grain.

The wall width to cell width ratio, $W_w/W_o$, is defined. The limits for this ratio are roughly between 10 and 20 percent. Less than 10 percent results in very thin walls and can result in blown out walls. Greater than 25 percent results in printing of the cell patterns, especially with solutions having viscosities higher than about 40 centipoise. The recommended value is approximately 15 percent.

The cell width is calculated by substituting the channel width to cell width and the wall width to cell width ratios into the horizontal repeat length (equation 2). The relationship of cell width to repeat length along with stylus angle and engraved volume are substituted into the volume equation (equation 9).

The channel and wall widths are calculated from the ratios defined above and the cell width. At this point the engraving machine settings can be programmed from $\theta$, $\alpha$, $W_o$, $W_c$ and $W_w$. For an Ohio engraving machine the following manipulations are followed.

The horizontal repeat length is calculated using equation 2.

The horizontal screen count is calculated by substituting the value of the horizontal repeat length in equation 3.

The actual screen count is now calculated from the horizontal screen and the compression angle by rearranging equation 6.

The vertical repeat length is calculated from the horizontal screen length and the compression angle using equation 5.

The vertical screen is now calculated from the vertical screen repeat length using equation 3.

The engraving vertical setting is calculated from the given cylinder circumference using equation 10.

EXAMPLE

Calculation for a coverage requirement of 0.7 cc/sqft to meet a required lay down specification.

1. Assuming 50 percent transfer efficiency the engraved volume would be 1.4 cc/sqft.
2. Choose a stylus angle of 120 degrees.
3. Choose a compression angle of 40 degrees.
4. For a 40 degree compression, a channel to cell width ration ($W_c/W_o$) of 18 percent is within the recommended limits defined in step 4.
5. The recommended wall to cell width ratio ($W_w/W_o$) is percent.
6. The cell width can now be calculated using equation 9. (The channel and wall width can be written in terms of the cell width using the ratios defined above.) From equation 2, $$X = W + 0.18W + 2{*}0.15W = 1.48W$$

Substituting values into equation 9, $$1.4 = \frac{1}{32\tan\left(\frac{120}{2}\right)} {*}(3W^2 + 2W(0.18W) + 3(0.18W)^2){*}\ \frac{2{*}25400^2}{1.48W} {*} \frac{144}{10^{12}}$$

$$W = 178 \text{ microns}$$

7. The channel and wall width defined as ratio's of the cell width are then determined.
   $W_c = 0.18{*}178 = 32$ microns
   $W_w = 0.15{*}178 = 27$ microns
8. The horizontal repeat length (from equation 2),
   $X = 1.48{*}178 = 263$ microns
9. The horizontal screen (equation 3), $$HS = \frac{1}{263} * 25400 = 97\ lpi \text{ (lines per inch)}$$

(Note: Ohio engraver horizontal screen $=\sqrt{2}*97=137$ lpi

10. The actual or line screen can be calculated using equation 6.

$$AS = \frac{\sqrt{2} * 97}{\sqrt{\tan 40}} = 150\ lpi$$

11. Using equation 5, the vertical repeat length can be calculated.

$V=263*\tan 40=220$ microns

12. The vertical screen (equation 3), $$VS = \frac{1}{220} * 25400 = 1151\ lpi$$

(Note: Engraver vertical screen $\sqrt{2}*115=163$ lpi)

13. The engraver vertical setting ($N_2$) for a cylinder having a 10 inch diameter is then determined.

$$N_2 = \frac{10.0 * \pi * 115}{7.5} = 481$$

Cylinders engraved using the above design guidelines which provided engraving dimension specifications, improved product yield significantly. Coating defects were reduced by improved cylinder engraving design and improved material yield was realized. Improved cylinder yield was achieved as cylinders manufactured by this method all performed acceptably. Prior art methods produced a high percentage of cylinders which did not perform acceptably.

A number of sample engravings were tested to determine the effect of the engraving variables on coatability. The summary of these findings are presented below.

The viscosity of the solution has a large influence on the type and size of the defect. Low viscosity coatings generally amplify the influence of the engraving dimensions, particularly with respect to graininess defects. With a low viscosity coating composition, the grain pattern appears more distinct and connected while with a standard viscosity graininess is not as regularly connected.

The tendency to form diagonal strings of grain showed a strong dependence on the channel width and the compression angle of the engraving. The diagonal string of grain along with density spots were seen on engravings where no channel or at large compression angles. The implication is that larger channels are required for elongated cells than for compressed cells. The influence of channel and compression angle has been observed in many cylinders. Cells with small, less than 25 microns, or no channel showed more of the grain defect while larger channels, greater than 25 microns, showed less defect. Larger channel widths, greater than 35 microns, showed more of a mottle type pattern. This indicates that the ideal channel width would be around 25 microns and below 35 microns to stay away from the mottle type imperfection.

All though there has been shown and described what are at present the preferred embodiments of the invention, it will be obvious to those skilled in the art that various changes and modifications may be made therein without departing from the scope of the invention as defined by the appended claims.

What is claimed is:

1. A method for engraving a gravure cylinder having a circumference C for coating a liquid composition on a substrate comprising:

determining a coverage VA, of the liquid composition on the substrate;

selecting a stylus angle $\theta$;

selecting a compression angle $\alpha$;

specifying a first ratio of channel width $W_c$ to cell width $W_o$;

specifying a second ratio of a wall width $W_w$ to cell width $W_o$ ratio;

calculating the cell width $W_o$ according to $$W_o=X-W_c-2W_w$$

wherein X is a horizontal repeat length; and $$VA = \frac{1122.5}{\tan\theta/2}[3W_o^2 + 2W_oW_c + 3W_c^2](\sqrt{2}/X)$$

calculating the channel width $W_c$ according to the first ratio;

calculating the wall width $W_w$ according to the second ratio; and engraving the gravure cylinder according to $\theta$, $\alpha$, $W_o$, $W_c$ and $W_w$.

2. The method according to claim 1 wherein the compression angle $\alpha$ is greater than 38°.

3. The method according to claim 1 wherein the first ratio is between 0.15 and 0.30.

4. The method according to claim 1 wherein the second ratio is between 0.10 and 0.25.

5. A method for engraving a gravure cylinder having a circumference C for coating a liquid composition on a substrate comprising:

determining a coverage VA, of the liquid composition on the substrate;

selecting a stylus angle $\theta$;

selecting a compression angle $\alpha$;

specifying a first ratio of channel width $W_c$ to cell width $W_o$;

specifying a second ratio of a wall width $W_w$ to cell width $W_o$ ratio;

calculating the cell width $W_o$ according to $$W_o=X-W_c-2W_w$$

wherein X is a horizontal repeat length; and $$VA = \frac{1122.5}{\tan\theta/2}[3W_o^2 + 2W_oW_c + 3W_c^2](\sqrt{2}/X)$$

calculating the channel width $W_c$ according to the first ratio;

calculating the wall width $W_w$ according to the second ratio;

calculating the horizontal repeat length X according to;

$$X=W_o+W_c+2W_w,$$

calculating a horizontal screen (HS) according to;

$$HS = \frac{\sqrt{2}}{X}$$

calculating a line screen according to;

$$AS = \frac{HS\sqrt{2}}{\sqrt{\tan\alpha}}$$

calculating a vertical screen (VS) count according to;

$$VS = \frac{AS}{\sqrt{\tan\alpha}\sqrt{2}}$$

calculating an engraver vertical setting $N_2$ according to;

$$N_2 = \frac{C*VS}{7.5}$$

engraving the gravure cylinder according to $N_2$ and $\theta$.

6. The method according to claim 5 wherein the compression angle $\alpha$ is greater than 38°.

7. The method according to claim 5 wherein the first ratio is between 0.15 and 0.30.

8. The method according to claim 5 wherein the second ration is between 0.10 and 0.15.

* * * * *

UNITED STATES PATENT AND TRADEMARK OFFICE

CERTIFICATE OF CORRECTION

PATENT NO. : 5,426,588

DATED : June 20, 1995

INVENTOR(S) : David W. Walters, et al

It is certified that error appears in the above-indentified patent and that said Letters Patent is hereby corrected as shown below:

Column 10, line 18, delete "0.15" and insert --0.25--.

Signed and Sealed this

Fifth Day of September, 1995

*Attest:*

BRUCE LEHMAN

*Attesting Officer* *Commissioner of Patents and Trademarks*